(12) United States Patent
Zhang

(10) Patent No.: US 8,788,094 B2
(45) Date of Patent: Jul. 22, 2014

(54) COOPERATIVE CONTROL DEVICE

(75) Inventor: Xiaolin Zhang, Yokohama (JP)

(73) Assignee: BI2-Vision Co. (JP)

( * ) Notice: Subject to any disclaimer, the term of this patent is extended or adjusted under 35 U.S.C. 154(b) by 257 days.

(21) Appl. No.: 13/505,265

(22) PCT Filed: Oct. 29, 2010

(86) PCT No.: PCT/JP2010/069282
§ 371 (c)(1),
(2), (4) Date: Jul. 13, 2012

(87) PCT Pub. No.: WO2011/052722
PCT Pub. Date: May 5, 2011

(65) Prior Publication Data
US 2012/0271456 A1    Oct. 25, 2012

(30) Foreign Application Priority Data

Oct. 31, 2009 (JP) .................................. 2009-251558

(51) Int. Cl.
*G06F 19/00* (2011.01)
*G05B 15/00* (2006.01)

(52) U.S. Cl.
USPC .................................. 700/245; 700/1; 700/9

(58) Field of Classification Search
USPC .................. 700/1, 9, 245; 701/1, 70
See application file for complete search history.

(56) References Cited

U.S. PATENT DOCUMENTS 7,272,306 B2 *   9/2007  Zhang et al. .................. 396/325
2005/0185945 A1 *  8/2005  Zhang et al. .................... 396/73

FOREIGN PATENT DOCUMENTS

| CN | 1492668 | 4/2004 |
|---|---|---|
| CN | 101731005 A | 6/2010 |
| EP | 2157783 A1 | 2/2010 |
| JP | 2006-502675 A | 1/2006 |
| JP | 2008-311690 A | 12/2008 |
| WO | WO 2004039077 A1 | 5/2004 |
| WO | WO 2008/152791 A1 | 12/2008 |
| WO | WO | 10/2010 |

PCT/JP2010/069282

OTHER PUBLICATIONS

Xiaolin Zhang, "Mathematical Model for Binocular Movements Mechanism and Construction of Eye Axes Control System", Journal of the Robotics Society of Japan, Jan. 15, 2002, vol. 20, No. 1, pp. 89-97.

* cited by examiner

*Primary Examiner* — Ian Jen
(74) *Attorney, Agent, or Firm* — Wells St. John P.S.

(57) ABSTRACT

Provided is a cooperative control device capable of advanced cooperative control. The cooperative control device for cooperatively controlling a plurality of control objects is provided with a pair of output control systems, a pair of crossing circuits, and transfer function units. The pair of output control systems is provided for a pair of control objects having respective control circuits. The pair of crossing circuits is provided from a first input side to a second output side and from a second input side to a first output side of the control circuit of the output control systems. The transfer function unit is provided in each pair of crossing circuits.

5 Claims, 3 Drawing Sheets

… (1)

COOPERATIVE CONTROL DEVICE

CROSS REFERENCE TO RELATED APPLICATION

This is a 35 U.S.C. §371 application of, and claims priority to, International Application No. PCT/JP2010/069282, which was filed on Oct. 29, 2010, and published as International Publication No. WO2011/052722, and which claims priority to Japanese Patent Application No. JP2009-251558, which was filed on Oct. 31, 2009, and the teachings of all the applications are incorporated herein by reference.

TECHNICAL FIELD

The present invention relates to a cooperative control device and, more particularly, to a cooperative control device that cooperatively controls a plurality of objects to be controlled.

BACKGROUND ART

Cooperative control for allowing a plurality of functions to cooperate with each other so as to increase efficiency as a whole has been adopted in various fields. For example, there is known, as an eyeball control system, Patent Document 1 invented by the same inventor as the present invention. The eyeball system is a system that controls two cameras so as to achieve conjugate and convergent movements simulating the principle of eye movement. Crossing circuits connect from one to the other and connect from the other to one, of left and right control systems for respective left and right cameras to be controlled. Using a coefficient $\rho_r$ allows cooperative control of different movements (conjugate and convergent movements) in the same system to be performed for the left and right control systems.

CITATION LIST

Patent Document

[Patent Document 1] Japanese Patent Application Kokai Publication No. 2006-502675

DISCLOSURE OF THE INVENTION

Problems to be Solved by the Invention

The technique disclosed in Patent Document 1 can achieve to some extent, a simple cooperative control for, e.g., binocular movement. However, the technique has difficulty to achieve the cooperative control for, e.g., a two-arm robot or vehicle wheels, requiring more advanced control.

The present invention has been made in view of the above situation, and an object thereof is to provide a cooperative control device capable of achieving advanced cooperative control.

Means for Solving the Problems

To achieve the above object, a cooperative control device of the present invention comprises: a pair of output control systems for at least a pair of targets to be controlled, each of the pair of output control systems having a control circuit section, respectively; a pair of crossing circuits, one of the pair of crossing circuits connecting from an input side of the control circuit section of the one of the pair of output control systems to an output side of the control circuit section of the other of the pair of output control systems, the other of the pair of crossing circuits connecting from an input side of the control circuit section of the other of the pair of output control systems to an output side of the control circuit section of the one of the pair of output control systems; and a transfer function section provided in each of the pair of crossing circuits.

The control targets may be at least a pair of wheels of a vehicle.

The control targets may be at least a pair of robot arms.

Advantages of the Invention

The cooperative control device of the present invention is capable of achieving advanced cooperative control.

PREFERRED EMBODIMENT OF THE INVENTION

Figure 1:
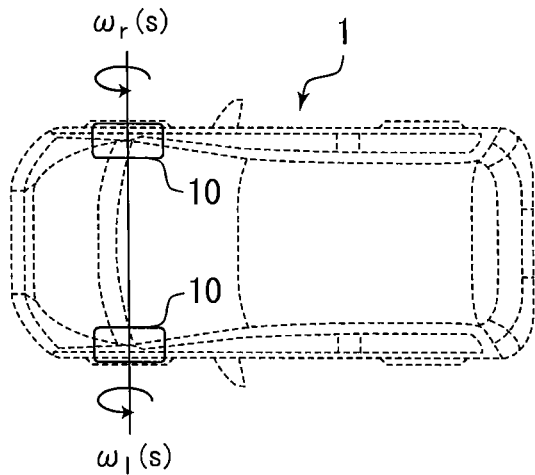
FIG. 1 is a schematic top view for explaining a vehicle and its wheels to be controlled by a cooperative control device according to the present invention.
Figure 2:
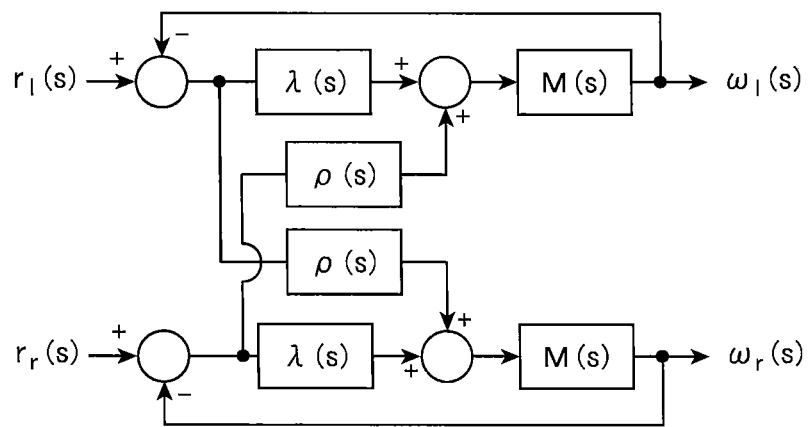
FIG. 2 is a control block diagram of the cooperative control device according to the present invention.

An embodiment for practicing the present invention will be described below with reference to the accompanying drawings. FIG. 1 is a schematic top view for explaining a vehicle and its wheels to be controlled by a cooperative control device according to the present invention. FIG. 2 is a control block diagram of the cooperative control device according to the present invention. The control block diagram of FIG. 2 represents a feedback-based cooperative control system. A vehicle 1 is, e.g., an independent wheel drive vehicle. Wheels 10 and 10 each called an in-wheel motor are used in the vehicle 1. That is, the wheels 10 and 10 have independent motors, which are controlled individually when the vehicle 1 drives. The following describes a case where the wheel pair are control targets.

As illustrated in FIG. 2, outputs of the control targets, i.e., rotation speeds of the left and right wheels 10 and 10 are represented as $\omega_l(s)$ and $\omega_r(s)$, respectively. A transfer function of each of the wheels 10 is represented as $M(s)$. A transfer function of a system serving as a control circuit section is represented as $\lambda(s)$. Further, target trajectories, i.e., target values of the rotation speeds of the left and right wheels 10 and 10 are represented as $r_l(s)$ and $r_r(s)$, respectively. FIG. 2 represents output control systems that input the target values of the left and right wheels 10 and 10, respectively, to cause the left and right wheels 10 and 10 to rotate at rotation speeds $\omega_l(s)$ and $\omega_r(s)$, respectively. The output control systems have left and right control circuit sections $\lambda(s)$ which are paired with each other.

As illustrated in FIG. 2, the cooperative control device according to the present invention has a pair of crossing circuits. One of the pair of crossing circuits connects from an input side of one of the control circuit sections $\lambda(s)$ to an output side of the other thereof in the output control systems. The other of the pair of crossing circuits connects from an input side of the other of the control circuit sections $\lambda(s)$ to an output side of the one thereof in the output control systems. The crossing circuits each have a transfer function section $\rho(s)$, which was merely a coefficient in the above-mentioned related art. The transfer function section $\rho(s)$ is a system transfer function.

Transfer functions of conjugate movement and relative movement are calculated as follows.

$$\varphi_l(s) + \varphi_r(s) = \frac{(\lambda(s) + \rho(s))M(s)}{1 + (\lambda(s) + \rho(s))M(s)}(r_l(s) + r_r(s))$$ [Formula 1]

$$\varphi_l(s) - \varphi_r(s) = \frac{(\lambda(s) - \rho(s))M(s)}{1 + (\lambda(s) - \rho(s))M(s)}(r_l(s) - r_r(s))$$ [Formula 2]

Figure 3:
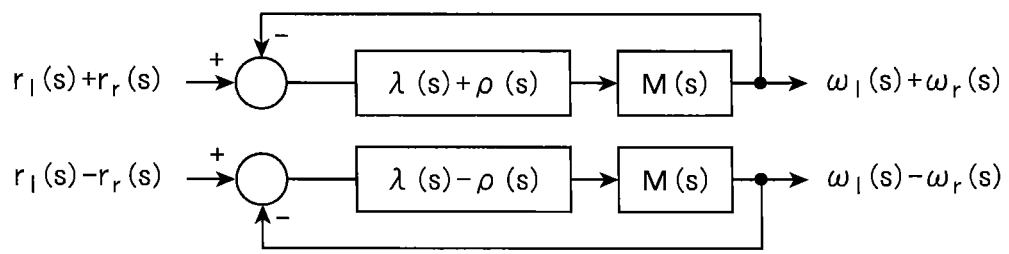
FIG. 3 is a control block diagram for explaining a control system obtained by modifying the cooperative control device of the present invention illustrated in FIG. 2.

Thus, the control system illustrated in FIG. 2 can be converted into a control system illustrated in FIG. 3. That is, FIG. 3 is a control block diagram for explaining a control system obtained by modifying the cooperative control device of the present invention illustrated in FIG. 2.

As is clear from FIG. 3, the transfer functions of the conjugate movement and relative movement can be set arbitrarily. Specifically, in a case where $\lambda(s)+\rho(s)=G_c(s)$, $\lambda(s)-\rho(s)=G_v(s)$ needs to be satisfied, the following equations are assigned to $\lambda(s)$ and $\rho(s)$ of FIG. 2.

$$\lambda(s)=(G_c(s)+G_v(s))/2$$

$$\rho(s)=(G_c(s)-G_v(s))/2$$

For example, $\lambda(s)+\rho(s)$ and $\lambda(s)-\rho(s)$ are expressed by the following equations, respectively.

$$\lambda(s) + \rho(s) = \frac{1}{T_c s M(s)}$$ [Formula 3]

where $T_c$ is a constant number, and s is a Laplace operator.

$$\lambda(s) - \rho(s) = \frac{1}{T_v s M(s)}$$ [Formula 4]

where $T_v$ is a constant number, and s is a Laplace operator. Thus, Formula 1 and Formula 2 are expressed by the following equations, respectively.

$$\varphi_l(s) + \varphi_r(s) = \frac{1}{T_c s + 1}(r_l(s) + r_r(s))$$ [Formula 5]

$$\varphi_l(s) - \varphi_r(s) = \frac{1}{T_v s + 1}(r_l(s) - r_r(s))$$ [Formula 6]

By setting $T_c \ll T_v$, forward rotation speeds of the wheels rapidly respond to the target values, whereas relative speed of the wheels, i.e., a difference between the left and right wheels in the rotation speed upon direction change slowly responds.

The following equations can be derived from Formula 3 and Formula 4, respectively.

$$\lambda(s) = \frac{1}{2sM(s)}\left(\frac{1}{T_c} + \frac{1}{T_v}\right)$$ [Formula 7]

$$\rho(s) = \frac{1}{2sM(s)}\left(\frac{1}{T_c} - \frac{1}{T_v}\right)$$ [Formula 8]

Thus, assigning Formula 7 and Formula 8 to the control block of FIG. 2 allows achievement of a control system in which the forward rotation speeds of the wheels rapidly respond to the target values, whereas the difference between the left and right wheels in the rotation speed slowly responds. $T_c$ or $T_v$ which is an arbitrary constant number may be determined according to type or performance of a vehicle. The speed at direction change can be controlled according to the type or speed of a vehicle, which can prevent, e.g., an overturn accident. Further, according to such a control system, even if one wheel fails, the slow relative movement reduce a difference between the other wheel and failed wheel in speed, thereby preventing hard turn of a vehicle.

If the transfer function $M(s)$ of each wheel is unclear, feedback control of the transfer function $M(s)$ is performed. When $M(s)$ can be set to a time constant sufficiently smaller than $T_c$ or $T_v$ as a result of the feedback control, it can be assumed that $M(s)=1$.

Although the control output is represented by the rotation speed in the illustrative examples, the present invention is not limited to this. For example, even when the control output is represented by torque, the same control block can be used in principle.

Further, although there is provided a feedback control path in the illustrative examples, the present invention is not limited to this, but the feedback control path need not always be provided. Furthermore, a feedforward control path may be provided as well as the feedback control path.

Figure 4:
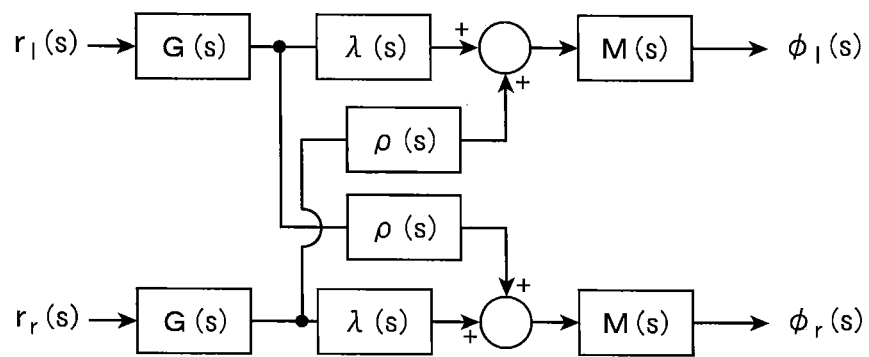
FIG. 4 is a control block diagram of another cooperative control device according to the present invention.

Further, although the crossing circuit connecting from a point between the target value ($r_l(s)$) of one side and the system transfer function ($\lambda(s)$) to a point between the system transfer function ($\lambda(s)$) and the transfer function ($M(s)$) to be controlled of the other side is provided in the illustrative example, the present invention is not limited to this, but another transfer function may be provided. FIG. 4 is a control block diagram of another cooperative control device according to the present invention. The control block diagram of FIG. 4 is a feedforward cooperative control system. In the drawing, $G(s)$ may represent an arbitrary transfer function. For example, a signal from an acceleration sensor of a vehicle may be used in the feedforward control. In the drawing, $r_l(s)$ and $r_r(s)$ represent input signals in the feedforward control and, for example, $r_l(s)$ and $r_r(s)$ which represent the signals from the acceleration sensor are input to $G(s)$ and $G(s)$, respectively. $\phi_l(s)$ and $\phi_r(s)$ are left and right control signal outputs.

Figure 5:
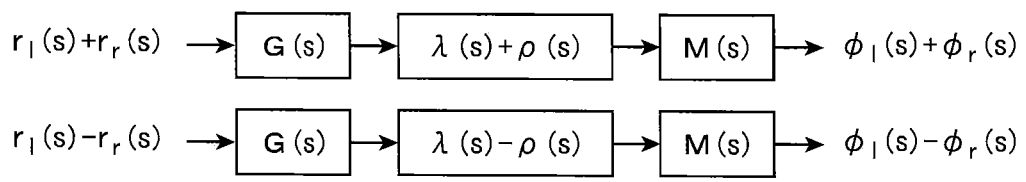
FIG. 5 is a control block diagram for explaining a control system obtained by modifying the cooperative control device of the present invention illustrated in FIG. 4.

The control system illustrated in FIG. 4 can be converted into a control system illustrated in FIG. 5, as in the case of the above-mentioned feedback control block. Thus, $\lambda(s)$ and $\rho(s)$ are calculated using the control system of FIG. 5, and then the obtained $\lambda(s)$ and $\rho(s)$ are assigned to FIG. 4, whereby a feedforward-based control system for the conjugate and relative movements can be achieved.

Figure 6:
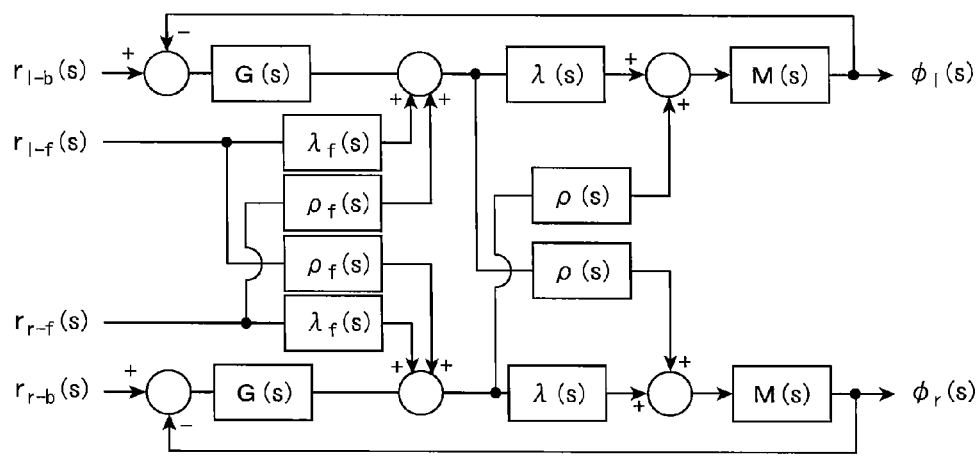
FIG. 6 is a control block diagram illustrating still another cooperative control device according to the present invention.

FIG. 6 is a control block diagram illustrating still another cooperative control device according to the present invention. The control block diagram of FIG. 6 represents a cooperative control system in which the feedback control circuit and feedforward control circuit exist together. In the drawing, $r_{l-f}(s)$ and $r_{r-f}(s)$ represent input signals of the feedforward control, $r_{l-b}(s)$ and $r_{r-b}(s)$ represent input signals of the feedback control. For example, a rotation speed signal (signal from a tachogenerator) of each wheel of a vehicle that has been fed back to be compared with the target value of the rotation speed of the wheel is input to G(s). On the other hand, $r_l$-f(s) and $r_{r-f}(s)$, which are the signals from the acceleration sensor, are each fed directly to a control loop to be subjected to feedforward control. Transfer functions $\lambda_f(s)$ and $\lambda_f(s)$ can be set arbitrarily.

Figure 7:
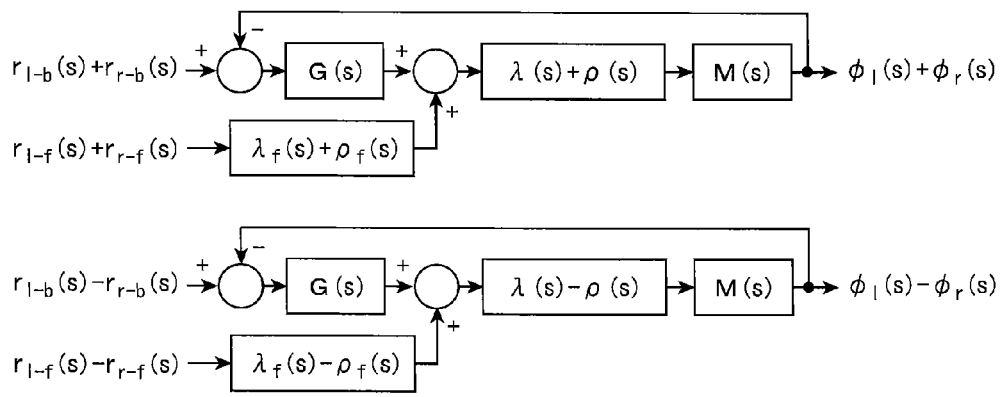
FIG. 7 is a control block diagram for explaining a control system obtained by modifying the cooperative control device of the present invention illustrated in FIG. 6.

The control system illustrated in FIG. 6 can be converted into a control system illustrated in FIG. 7, as in the case of the above-mentioned feedback control block. Thus, $\lambda(s)$, $\rho(s)$, $\lambda_f(s)$, and $\rho_f(s)$ are calculated using the control system of FIG. 7, and then the obtained $\lambda(s)$, $\rho(s)$, $\lambda_f(s)$, and $\lambda_f(s)$ are assigned to FIG. 6, whereby a feedback/feedforward-based control system for the conjugate and relative movements can be achieved.

For example, a transfer function from a conjugate control signal $r_{l-f}(s)+r_{r-f}(s)$ of the feedforward control to a conjugate control output signal $\phi_l(s)+\phi_r(s)$ is $(\lambda_f(s)+\rho_f(s))$ $(\lambda(s)+\rho(s))$ M(s), so that arbitrarily setting $\lambda_f(s)+\rho_f(s)$ allows feedforward control characteristics to be adjusted arbitrarily. As described above, it is only necessary to adjust $\lambda_f(s)+\rho_f(s)$ in order to adjust the feedforward control characteristics. Further, it is only necessary to adjust $\lambda(s)+\rho(s)$ in order to adjust control characteristics of both the feedforward and feedback.

Although the pair of wheels of a vehicle are used as the control targets and rotation speeds of the wheels are controlled in the above illustrative examples, the present invention is not limited to this, but torque of the wheels may be controlled. Further, the rotation speeds or torque may be controlled with front and rear wheels set as the control targets.

Further, the cooperative control device of the present invention may be applied to every control target as long as a plurality of control targets are subjected to the cooperative control. That is, the cooperative control device is effective in a case where a pair of output control systems need to be controlled with a control algorithm in which the conjugate and relative movements differ from each other. For example, the cooperative control device may be applied to a pair of robot arms. A two-arm robot performs two operations: one is grasping of an object with the arms; and the other is lifting of the grasped object and moving it to a specific position. In this case, the grasping with the arms corresponds to the relative movement, and lifting/moving corresponds to the conjugate movement.

The cooperative control device of the present invention is not limited to the above illustrative examples, but may be variously changed without departing from the scope of the present invention.

EXPLANATION OF REFERENCE SYMBOLS

1: Vehicle
10: Wheel

What is claimed is:

1. A cooperative control device that cooperatively controls a plurality of objects to be controlled, the cooperative control device comprising:
   a pair of output control systems for at least a pair of targets to be controlled, each of the pair of output control systems having a control circuit section, respectively;
   a pair of crossing circuits, one of the pair of crossing circuits connecting from an input side of the control circuit section of the one of the pair of output control systems to an output side of the control circuit section of the other of the pair of output control systems, the other of the pair of crossing circuits connecting from an input side of the control circuit section of the other of the pair of output control systems to an output side of the control circuit section of the one of the pair of output control systems; and
   a transfer function section provided in each of the pair of crossing circuits.

2. The cooperative control device according to claim 1, in which the control targets are at least a pair of left and right wheels or a pair of front and rear wheels of a vehicle.

3. The cooperative control device according to claim 2, in which a rotation speed of at least the pair of left and right wheels or the pair of front and rear wheels are subjected to the cooperative control.

4. The cooperative control device according to claim 2, in which torque of at least the pair of left and right wheels or the pair of front and rear wheels are subjected to the cooperative control.

5. The cooperative control device according to claim 1, in which the control targets are at least a pair of robot arms.

\* \* \* \* \*

UNITED STATES PATENT AND TRADEMARK OFFICE
CERTIFICATE OF CORRECTION

PATENT NO.        : 8,788,094 B2
APPLICATION NO.   : 13/505265
DATED             : July 22, 2014
INVENTOR(S)       : Xiaolin Zhang It is certified that error appears in the above-identified patent and that said Letters Patent is hereby corrected as shown below:

SPECIFICATION

Column 5, line 7-8 – Replace "On the other hand, $r_l$-f(s)" with
--On the other hand, $r_{l-f}(s)$--

Column 5, line 10 – Replace "and $\lambda_f(s)$ can be" with --and $\rho_f(s)$ can be--

Column 5, line 16 – Replace "and $\lambda_f(s)$ are assigned" with
--and $\rho_f(s)$ are assigned--

Signed and Sealed this
First Day of March, 2016

Michelle K. Lee
*Director of the United States Patent and Trademark Office*